(12) United States Patent
Evans et al.

(10) Patent No.: US 10,730,774 B1
(45) Date of Patent: Aug. 4, 2020

(54) WASTE WATER TREATMENT SYSTEM AND METHOD

(71) Applicants: M. Eugene Evans, Pearson, FL (US); Ivey L. Burns, Kissimmee, FL (US); Kelvin Todd Evans, Orange City, FL (US)

(72) Inventors: M. Eugene Evans, Pearson, FL (US); Ivey L. Burns, Kissimmee, FL (US); Kelvin Todd Evans, Orange City, FL (US)

( * ) Notice: Subject to any disclaimer, the term of this patent is extended or adjusted under 35 U.S.C. 154(b) by 89 days.

(21) Appl. No.: 14/273,849

(22) Filed: May 9, 2014

Related U.S. Application Data

(60) Provisional application No. 61/821,876, filed on May 10, 2013.

(51) Int. Cl.
| | |
|---|---|
| *C02F 3/08* | (2006.01) |
| *C02F 9/00* | (2006.01) |
| *C02F 1/42* | (2006.01) |
| *C02F 1/32* | (2006.01) |
| *C02F 3/34* | (2006.01) |
| C02F 101/16 | (2006.01) |
| C02F 101/20 | (2006.01) |
| C02F 101/10 | (2006.01) |

(52) U.S. Cl.
CPC .................. *C02F 9/00* (2013.01); *C02F 1/32* (2013.01); *C02F 1/42* (2013.01); *C02F 3/08* (2013.01); *C02F 3/34* (2013.01); *C02F 2101/105* (2013.01); *C02F 2101/16* (2013.01); *C02F 2101/163* (2013.01); *C02F 2101/20* (2013.01)

(58) Field of Classification Search
CPC .... C02F 3/302; C02F 3/10; C02F 3/06; C02F 3/223; C02F 9/00; C02F 2303/04; C02F 3/121; C02F 1/28; C02F 1/288; C02F 2101/16; C02F 2101/166; C02F 3/1252; Y10S 210/903; B01D 2201/02; B01D 24/005; B01F 5/0212; B01F 5/0413
USPC .............................. 210/159.1, 903, 189, 681
See application file for complete search history.

(56) References Cited

U.S. PATENT DOCUMENTS

| | | | |
|---|---|---|---|
| 2,067,161 | A | 1/1937 | Durdin, Jr. |
| 3,043,433 | A | 7/1962 | Singer |
| 3,706,380 | A | 12/1972 | Quinquis |
| 3,731,812 | A | 5/1973 | Stone |
| 3,799,346 | A | 3/1974 | Freese |
| 4,104,167 | A | 8/1978 | Besik |

(Continued)

OTHER PUBLICATIONS

J. Shan; T.C. Zhang; "Septic Tank Effluent Denitrification with Sulfur/Limestone Processes"; Conference of Hazardous Waste Research; 1998.

(Continued)

*Primary Examiner* — Claire A Norris
(74) *Attorney, Agent, or Firm* — Stephen G. Anderson; GrayRobinson, P.A.

(57) ABSTRACT

Disclosed is a system and method for treating nitrogen-rich effluent water utilizing a partially aerobic bioreactor. The bioreactor comprises a first housing having a plurality of openings and a second housing positioned within the first housing, the second housing directing a flow of effluent against the openings. When the effluent is circulated through the bioreactor it contacts aerobic microorganisms carried within the first housing for metabolizing nitrogenous compounds.

20 Claims, 3 Drawing Sheets

(56) References Cited

U.S. PATENT DOCUMENTS

| | | | |
|---|---|---|---|
| 4,294,697 A * | 10/1981 | Sawa | C02F 1/283 210/221.1 |
| 5,030,353 A | 7/1991 | Stuth | |
| 5,032,276 A | 7/1991 | Mackrle et al. | |
| 5,196,114 A | 3/1993 | Burwell | |
| 5,338,447 A | 8/1994 | Vellinga | |
| 5,441,634 A | 8/1995 | Edwards | |
| 5,518,618 A | 5/1996 | Mulder et al. | |
| 5,609,754 A | 3/1997 | Stuth | |
| 5,876,603 A | 3/1999 | Sumino et al. | |
| 7,332,077 B2 | 2/2008 | Pollock | |
| 7,537,698 B2 | 5/2009 | Sumino et al. | |
| 8,282,818 B1 * | 10/2012 | Dobie | C02F 3/06 210/151 |
| 8,293,109 B2 | 10/2012 | Kimura et al. | |
| 2005/0211644 A1 * | 9/2005 | Goldman | C02F 1/004 210/786 |
| 2007/0187329 A1 * | 8/2007 | Moller | C02F 1/288 210/670 |
| 2007/0267346 A1 * | 11/2007 | Sengupta | C02F 3/04 210/610 |
| 2008/0099404 A1 * | 5/2008 | Markham | C02F 1/281 210/663 |
| 2009/0032451 A1 * | 2/2009 | Tsutsumi | C02F 3/04 210/150 |
| 2010/0038311 A1 | 2/2010 | Abe et al. | |
| 2011/0163049 A1 * | 7/2011 | Felch | C02F 1/004 210/794 |
| 2012/0055865 A1 * | 3/2012 | Mohseni | C11D 3/43 210/348 |
| 2014/0083941 A1 * | 3/2014 | Le Tallec | C02F 3/10 210/618 |
| 2014/0220673 A1 * | 8/2014 | Chiu | B01L 3/502746 435/309.1 |
| 2015/0108060 A1 * | 4/2015 | Takahashi | B01D 69/08 210/490 |

OTHER PUBLICATIONS

Shih-Hui Pan; "Autotrophic Denitrification of Groundwater in a Granular Sulfur-Packed Up-Flow Reactor"; Presented to the Faculty of the Graduate School of the University of Texas at Arlington; May 2007.

* cited by examiner

WASTE WATER TREATMENT SYSTEM AND METHOD

RELATED APPLICATION DATA

This application claims priority to Provisional Application Ser. No. 61/821,876 filed on May 10, 2013 and entitled "Waste Water Treatment System and Method," the disclosure of which is fully incorporated by reference herein for all purposes.

TECHNICAL FIELD

This disclosure generally relates to water filtration systems and in particular to treatment of waste water.

BACKGROUND OF THE INVENTION

Traditional home septic systems are effective at reduction of solid waste and converting nitrogenous compounds to stable nitrates. A liquid nitrate stream moves unimpeded through the soil substrate resurfacing as groundwater bearing pollutants that facilitate algal blooms, disrupts biological cycles, and when consumed by humans, may constitute a direct health threat.

Septic systems are typically relegated to single user rural areas where central treatment systems are impractical due to the low population density and long distances from a centralized location for treatment. The millions of these systems constitute a real environmental contaminant threat.

While large municipal treatment plants are capable of removing nitrates through a complicated series of aerobic and anaerobic processes which convert the nitrate into nitrogen gas through oxidative and reductive action, their remote locations confound the transport of waste to and from the facility, limiting the practicality of utilizing reclaimed water to serve remote customers.

Until recently small, 500 gallon per day, treatment systems have not been able to provide discharge waters low enough in nitrate to be considered non-polluters. The discharge waters from these systems has not been considered to be of high enough quality to be available for reuse in irrigation systems, or surface water recharge.

There is a need for small single user systems that are capable of producing discharge water that is devoid of typical contaminants present in septic systems such as nitrates, phosphorus, and heavy metals.

SUMMARY OF THE INVENTION

The present invention is directed towards providing small single user filtration systems that produce discharge water devoid of typical contaminants present in septic systems such as nitrates, phosphorus, and heavy metals. With a disinfection source such as Ultraviolet light (UV), the systems herein described by way of example, produce bacteria and virus free water that approaches drinking water standards.

The teachings of the present invention may comprise a method of providing additional treatment to a septic system for removing toxic and environmentally challenged waste using an aerobic moving bed bioreactor. One embodiment may comprise a self-metered (first order substrate limited bio-reaction) sulfur bed reactor for removing nitrate compounds. Incorporating a tertiary reactor including a selective metallic ion absorptive bed results in polished outgoing water.

One embodiment of the invention may include multiple phases of treatment with a first aerobic phase incorporating a conical, air fed, pumped moving bed bioreactor for converting ammonia to nitrites and then nitrates. An active mixing of primary effluent from a septic tank may be received to normalize nutrient loading for biological conversion. A second phase of treatment may comprise a packed column, hydraulically controlled sulfur reactor for removing nitrate compounds from the effluent through a conversion to nitrites and then nitrogen gas. A third phase may comprise water polishing for removing impurities. The third phase may comprise a metallic ion absorption bed for the absorption of phosphorous, heavy metals and toxins. The use of automatic weirs and hydraulic limiters may be used to balance flow throughout the treatment system to enhance efficiency. Yet further, a fourth treatment phase may comprise ultraviolet disinfection to reduce bacterial and viral pathogens present in discharge waters from the combined bio-reactors.

By way of example, one embodiment may comprise providing such a treatment system inserted within an existing pathway of a standard septic system. Such an embodiment may be an Inline Waste Advanced Water Treatment System (IWATS) that is placed in-line with an existing septic system to produce high-grade water without a major modification or disruption of use. When installed as a new, or as a replacement system, the IWATS eliminates the need for a traditional drain field, the most common failure component of modern septic systems. One method of waste water treatment includes treating an effluent stream from a typical household or small business, coupled with a typical septic treatment system, to provide a desirable removal of organic waste, specifically the nitrogenous waste steam.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
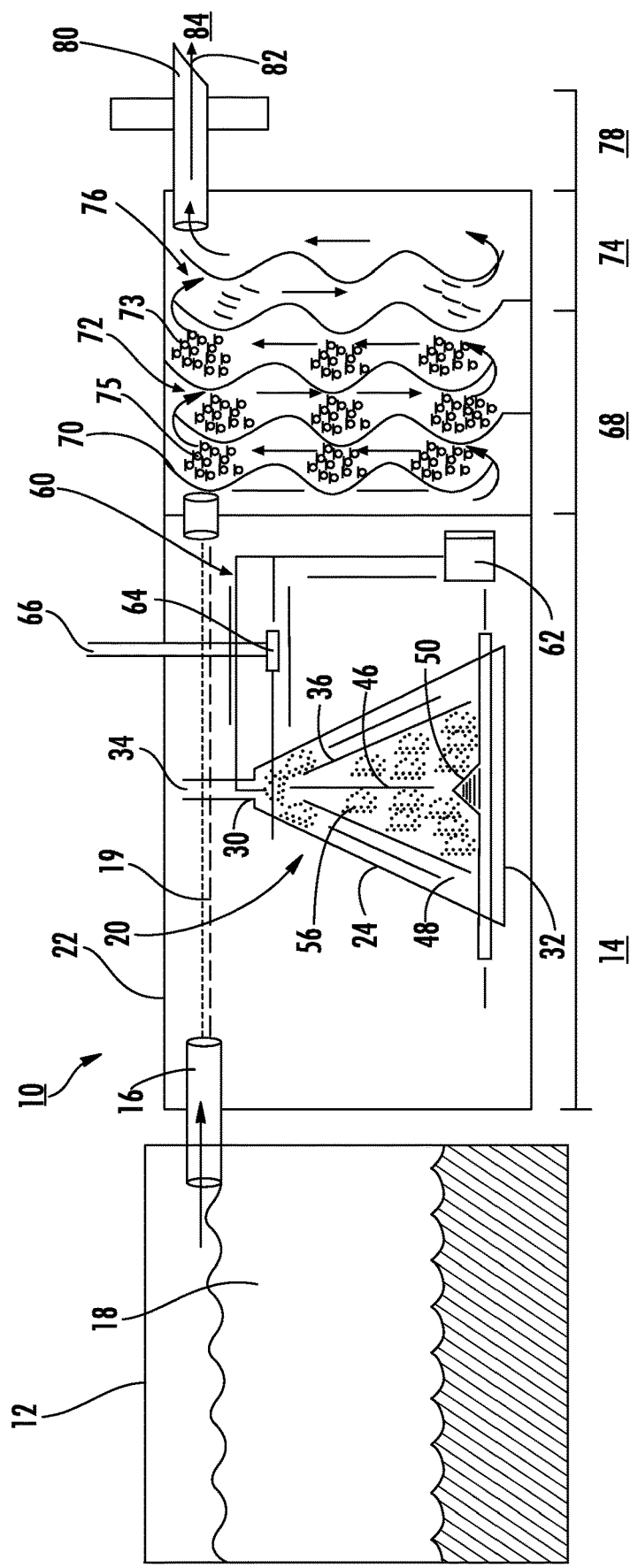
FIG. 1 is a side cross-sectional view of an embodiment of the present disclosure.
Figure 2:
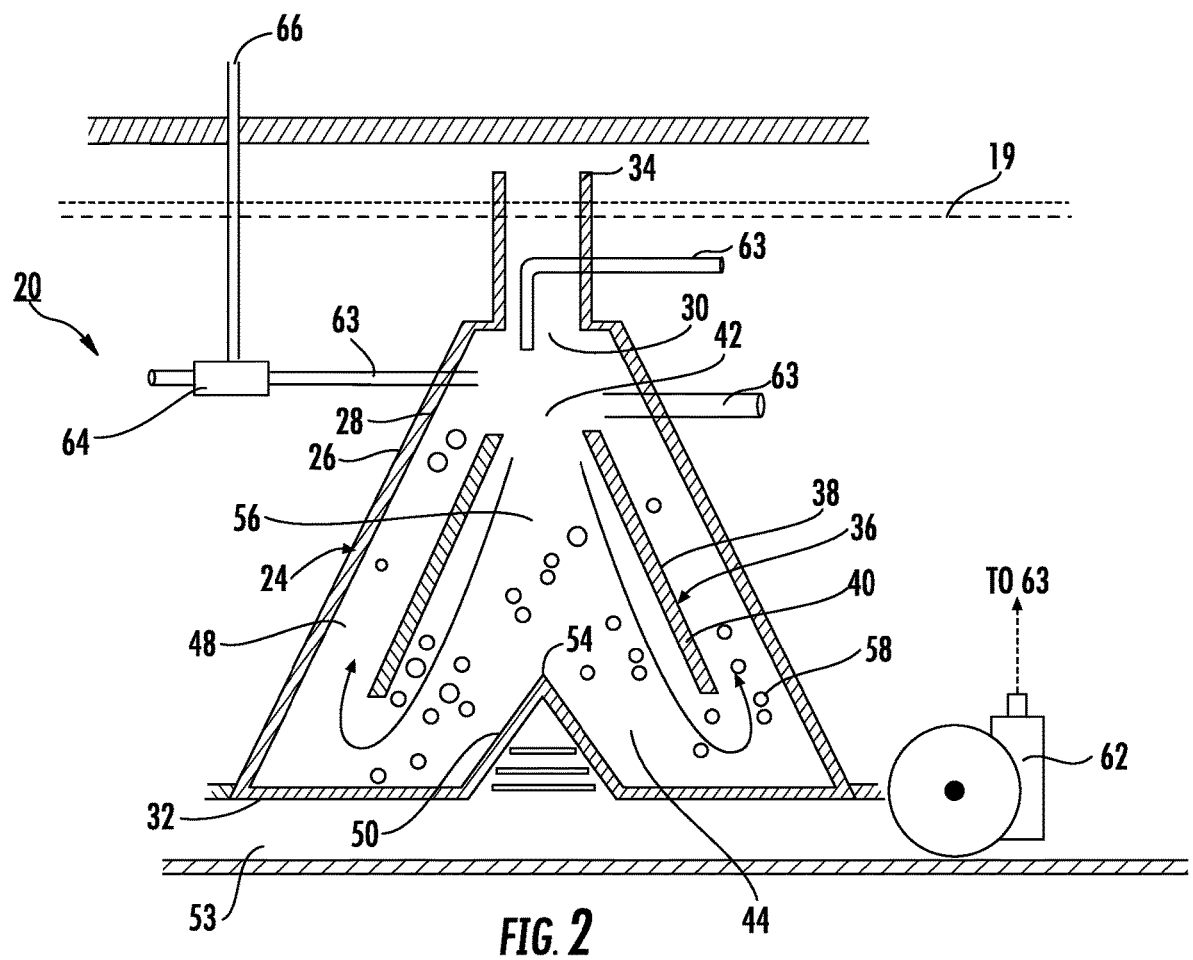
FIG. 2 is a side cross-sectional view of an embodiment of a bioreactor of the present disclosure.

With reference initially to FIGS. 1 and 2, one embodiment is herein described as a waste water treatment system 10 including a series of combined reactors, some functioning as aerobic oxidation converters and some as anaerobic conversion reactors. The system 10 may comprise several phases, each phase functioning to further cleanse or purify effluent 18. For example, in one embodiment a first aerobic treatment phase 14 includes an inlet port 16 for receiving the effluent 18 from an effluent source 12, the inlet port 16 providing the effluent 18 to a conical, air fed, moving bed bioreactor 20 disposed within a holding tank 22 that converts ammonia to nitrites and then nitrates. The bioreactor 20 herein described by way of example includes generally concentric conical members, such as an outer cone 24, an intermediate cone 36, and a slotted cone 50. However, shapes other than concentric conical members are considered to be within the scope of the present invention. For example, the bioreactor 20 may include domed or sloped members.

With continued reference to the embodiment depicted in FIG. 2, the outer cone 24 includes an outer surface 26, an inner surface 28, a top opening 30, and a base portion 32, the top opening 30 in communication with an exhaust vent 34, the base portion 32 having a diameter greater than a diameter of the top opening 30.

The intermediate cone 36 includes an outer surface 38, an inner surface 40, a top opening 42, a bottom opening 44, and a center axis 46, the bottom opening 44 having a diameter greater than a diameter of the top opening 42. The intermediate cone 36 is positioned within the outer cone 24, thereby forming an outer passage 48 between the outer surface 38 of the intermediate cone 36 and the inner surface 28 of the outer cone 24.

The slotted cone 50 is integral with the base portion 32 of the outer cone 24 and centered along the center axis 46 of the intermediate cone 36, the slotted cone 50 having a plurality of slots 52 and a top portion 54 extending inwardly toward the top opening 42 of the intermediate cone 36, thereby forming a central passage 56 between the slotted cone 50 and the inner surface 40 of the intermediate cone 36, the central passage 56 being in fluid communication with the outer passage 48, wherein each slot 52 permits a flow of effluent 18 through the slotted cone 50 and outside of the bioreactor 20.

In one embodiment, a plurality of beads 58 are disposed within the bioreactor 20 and placed in fluid communication with the effluent 18. Among other benefits to the system 10, the beads 58 aid in supporting an even oxygenation of the effluent 18. While not a requirement, it is preferred that each bead 58 is sufficiently buoyant to permit the flow of the beads 58 through the system 10. The beads 58 are further adapted to support at least one microbial colony for metabolizing nitrogenous nutrient compounds present in the effluent 18, each bead 58 having a diameter sufficient for preventing passage through the slots 52 of the slotted cone 50. As will be understood by those of skill in the art, now having the benefit of the teachings of the present invention, the beads 58 may comprise cylindrical shapes, spherical shapes, and the like with a surface generally receptive to collecting a layer of bacteria. Further, the beads 58 may be formed from a material capable of supporting a bacterial colony, such as polystyrene, polyester, or other suitable material. This first treatment phase 14 is operable for converting the nitrogenous compounds to nitrate through an oxidative process. During operation, the beads 58 constantly swirl within the bioreactor 20 of the system 10 while the effluent 18 containing the nitrogen compounds recycles within the first treatment phase 14 until almost all of the nitrogen is converted to nitrate. In one embodiment, this reaction is accomplished by the aerobic bacteria *nitrosomonas* (sp) and *nitrobacter* (sp) primarily, which adhere and thrive on the bead media 58. However, other suitable microorganisms as considered to be within the scope of the present disclosure.

The effluent 18 is circulated through the first treatment phase 14 of the system 10 by a powered circulation system 60. In one embodiment, the circulation system 60 includes a pump 62 and a venturi eductor 64 operably coupled to an air inlet 66. The pump 62 circulates the effluent 18 within the holding tank 22 between the interior and the exterior of the bioreactor 20, while the venturi eductor 64 serves to oxygenate the effluent 18 by drawing in air via the air inlet 66 and mixing the air with the effluent 18.

Figure 3:
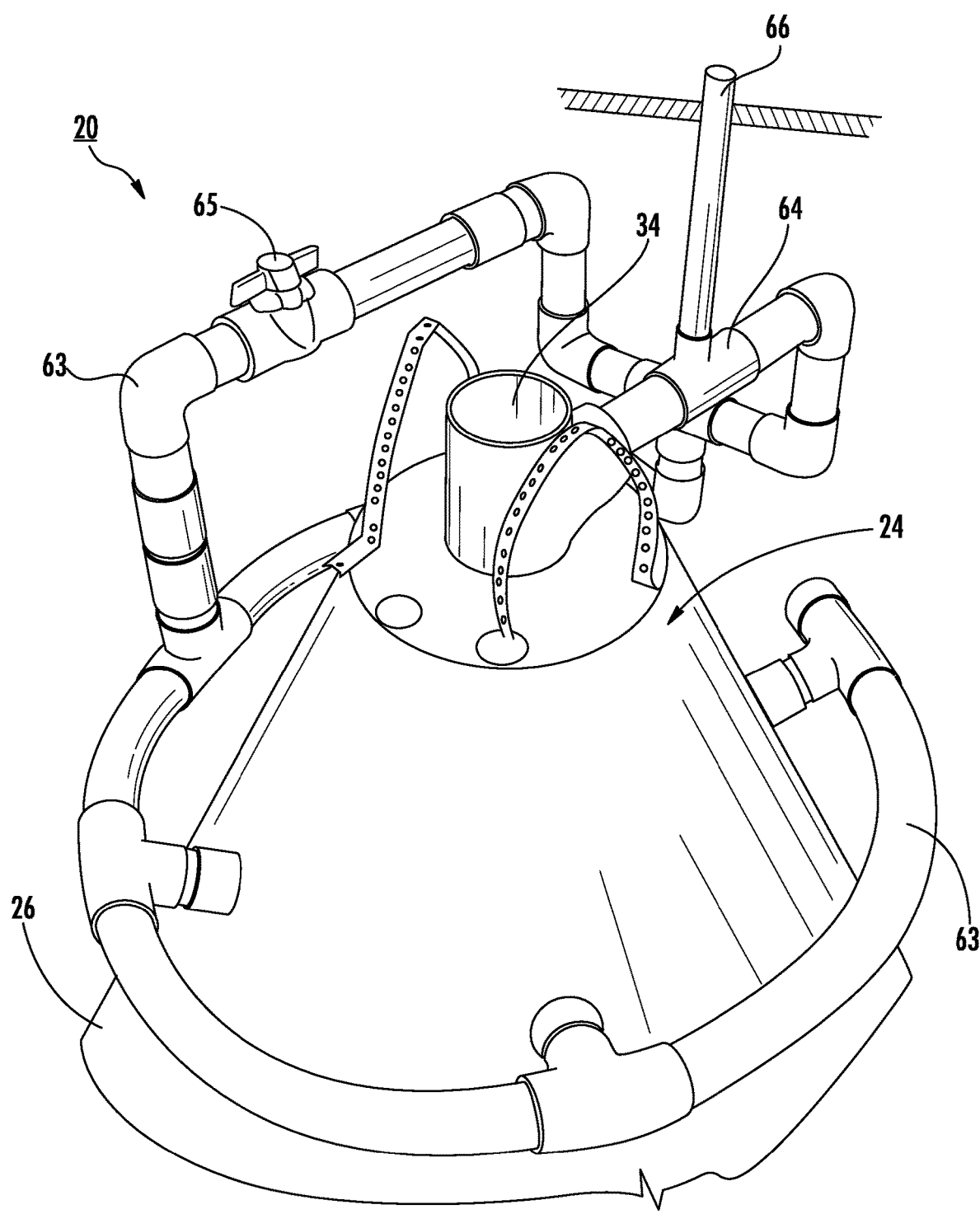
FIG. 3 is a top perspective view of an embodiment of the present disclosure.

In use, effluent 18 is pumped from the bottom of the holding tank 22 downward through the top portion 30 of the outside cone 24 forcing flow through an opening in a top portion 42 of the intermediate cone 36 and thus initial flow through the central passage 56. The initial flow carries the beads 58 downward and against the slotted cone 50 positioned generally below and centered along an axis 46 of the intermediate cone 36. By way of example, the beads 58 may comprise diameters about $50/1000$ of an inch, while the slots 52 have openings of about $35/1000$ of an inch. The effluent 18 flow forces the beads 58 against the slotted cone 50 and diverts the flow around the lower portion 44 of the intermediate cone 36 and up through the outer passage 48. The effluent 18 flows both upward driving the beads 58 through the outer passage 48 and flows through the slots 52 and through channels 53 below the outside cone 24 and external to the bioreactor 20. In the embodiments depicted in FIGS. 2 and 3, a portion of the circulating effluent 18 passes through an oxygenation apparatus, such as a venturi eductor 64.

For the embodiment herein described by way of example, the bioreactor element 20 is a conical device using sufficiently buoyant beads 58 that are constantly mixing and moving the effluent 18, thereby eliminating a common failure point for typical aerobic reactors with fixed beds where buildup of bacterial "floc" often obstructs flow through the reactor causing failure. The beads 58 strike each other allowing bacterial coating thereon to be generally uniformly maintained. It is desirable to have such a layer of bacteria adhere to the beads.

For the embodiment herein described by way of example, one desirable feature of the system 10 is the manner in which nutrient loading to the bioreactor 20 is normalized through the mixing process where fluid moving though the bioreactor 20 is exchanged within the holding tank 22 where approximately a day's worth of sewage effluent 18 may be housed. By way of example, a household stream providing effluent 18 to the system 10 via inlet port 16 varies dramatically depending on the feed source where laundry or shower waste is very low in nitrogen and toilet flushes are very high. All bioreactors are limited by the fact that their conversion is a first order substrate limited reaction where the ability to process waste is limited by the number of functioning bacteria in the system which in turn is determined by the concentration of the feed source. This ratio governed reaction has a time lag determined by the reproductive rate of the bacteria, whose half-life is functionally considered to be 24 hours. The holding of a level of effluent 19, and thus a normalized concentration of nitrogen, is therefore desirable for efficient operation.

With reference again to FIG. 1, when the aerobically treated effluent 18 containing predominantly nitrate is received from the first aerobic treatment phase 14 by a second treatment phase 68 of the process, a secondary reactor, such as a packed column 72, completes the conversion of nitrate to nitrogen gas. In one embodiment, this reaction is accomplished by a sulfur denitrifier, as it is commonly called. In this anaerobic process, the bacterium

*Thiobacillus denitrificans* (sp) reduces the nitrate to nitrite, and then to nitrogen gas in a reaction that requires sulfur to serve as an electron donor. In addition to sulfur, carbonate is consumed in the reaction. At this point in the process, the nitrogen has been almost completely removed from the effluent 18, solids digested and some phosphorus has reacted through the sulfur mix packed column 72. The sulfur reactive media of the second treatment phase 68 comprises a blend of sulfur pellets and calcium carbonate granules.

In one exemplary embodiment, the second treatment phase 68 includes labyrinthal or serpentine flow baffles 70 having the packed column 72 of sulfur pellets 73 and calcium carbonate granules 75. In another embodiment, the baffles may comprise cylindrical cartridges or other exchangeable, interchangeable, and readily replenishable and rechargeable apparatus for ease of replenishment of the sulfur pellets 73 and calcium carbonate granules 75. The second treatment phase 68 may be a hydraulically controlled sulfur reactor for removing the nitrates from the effluent 18 through a conversion to nitrites and then nitrogen gas.

In the embodiment depicted in FIG. 1, the effluent 18 then enters a third treatment phase 74. The third treatment phase 74 receives the effluent 18 from the second treatment phase 68. The third treatment phase 74 includes water polishing for removing impurities, wherein the third treatment phase 74 includes a metallic ion adsorption bed 76 for adsorption of phosphorous, heavy metals and toxins. In one embodiment, this polishing step utilizes an iron ferrite media, which absorbs and adsorbs any remaining phosphorus along with heavy metals and toxins such as cadmium and arsenic. The media used during the third treatment phase 74 may also be housed in baffles 70 or, alternatively, in cylindrical cartridges or other exchangeable, interchangeable, and readily replenishable and rechargeable apparatus as described above with reference to the second treatment phase 68 for ease of replenishment. The treated effluent 82 exiting the system 10 is prepared to enter a simple leaching field 84 or storage tank for secondary usage.

As depicted in FIG. 1, an optional fourth treatment phase 78 for receiving effluent 18 from the third treatment phase 74 may be included as part of the system. In one embodiment, the fourth treatment phase 78 includes an ultraviolet disinfection apparatus 80 for reducing bacterial and viral pathogens present in treated effluent 82 being discharged from the system. For example, the fourth phase may include an optional UV treatment at 180 mj-sec/cm2 for destroying pathogenic organisms per EPA drinking water standards.

At this point, the discharged treated effluent 82 is of exceptional quality and no longer poses any environmental or health challenge. By way of example for the embodiment herein described, the size of the combined reactors (i.e the first 14, second 68, and third 74 treatment phases) is equal to a septic tank receiving tank roughly 500 gallons. However, the actual size of the system 10 is easily scalable to treat multiple family feeds with its attendant efficiency increasing commensurately.

The combined phases 14, 68, 74 are sized to require maintenance, primarily the refilling of the sulfur reactor and exchanging the ferrous materials, every six months under normal usage. The entire system 10 may be a single unit that is plumbed in line with any pre-existing septic system.

In use, and with continued reference to the embodiment depicted in FIGS. 1 and 2, the effluent 18 is initially contained in a well-known effluent source 12, such as a septic holding tank, where solids settle out and anoxic or anaerobic bacteria begin to digest organic compounds. The effluent 18 from the effluent source 12 is received by the system 10 via inlet port 16 and moves into the mixed bioreactor holding tank 22. As above described, effluent 18 is circulated by the pump 62 and aerated by the venturi eductor 64 as it flows into the bioreactor 20 where the gently moving beads 58 keep bio-floc generated by the aerobic bacteria from fouling or clogging the system 10, meanwhile assuring an even oxygenation of the effluent 18 to support the aerobes. The circulation system 60 simultaneously creates a downward flow of effluent 18 and beads 58 within the central passage 56 and an upward flow of effluent 18 and beads 58 within the outer passage 48.

In one embodiment the effluent 18 discharging the moving bed bioreactor 20 is mixed according to ratios of about 80% being recycled with about 20% moving into the sulfur denitrifier of the second treatment phase 68 of the system 10. Control is provided by the pump 62 and tubing 63 including a valve 65 for modulating flow, as illustrated with reference to FIG. 3.

The effluent 18 then moves in plug flow (or laminar flow) through the sulfur mix reactor (second treatment phase 68) labyrinthal flow baffles, as illustrated with reference again to FIG. 1. The third treatment phase 74 is part of the flow path through the baffles where processed iron oxide polishes the effluent.

Effluent 18 may exit the third treatment phase 74 of the system 10 in route to either a holding tank (not shown) and or a leach field or drain field 84 for absorbing the treated effluent 82 into the ground water system. Optionally, the fourth treatment phase 78 may be positioned downstream of the third treatment phase 74, the fourth treatment phase 78 including the high-powered UV sterilizer or disinfection apparatus 80 to destroy or deactivate viral and bacterial pathogens.

Another embodiment of the present disclosure includes a method for treating waste water as the effluent 18, the method comprising receiving a volume of effluent 18 in the holding tank 22, treating the effluent 18 with the bioreactor 20 disposed within the holding tank 22, wherein the bioreactor 20 comprises a plurality of circulating beads 58 carried within a housing 23, the plurality of circulating beads 58 supporting at least one microbial colony for metabolizing nitrogenous compounds, and discharging treated effluent 82.

Although the invention has been described relative to various selected embodiments herein presented by way of example, there are numerous variations and modifications that will be readily apparent to those skilled in the art in light of the above teachings. For instance, varying the order and/or the orientation of the first, second, third, and fourth treatment phases is considered to be within the scope of the present invention. Also by way of example, it will come to the mind of those skilled in the art that such effluent treatment systems and methods taught by the present invention may be used in effectively treating effluent from other than a septic system. It is therefore to be understood that, within the scope of claims supported by this specification, the invention may be practiced other than as specifically described.

What is claimed is:

1. A waste water treatment system comprising:
    an effluent source;
    a first treatment phase having an inlet port for receiving effluent from the effluent source, the first treatment phase having a conical, air fed, moving bed bioreactor disposed within a holding tank for converting ammonia to nitrites and then nitrates, the bioreactor including:
    an outer cone having an outer surface, an inner surface, a top opening, and a base portion, the top opening in communication with an exhaust vent, the base portion having a diameter greater than a diameter of the top opening;

an intermediate cone having an outer surface, an inner surface, a top opening, a bottom opening, and a center axis, wherein the center axis is perpendicular to the base portion of the outer cone, the bottom opening having a diameter greater than a diameter of the top opening, the intermediate cone positioned within the outer cone, thereby forming an outer passage between the outer surface of the intermediate cone and the inner surface of the outer cone;

a slotted cone extending upward from the base portion of the outer cone and centered along the center axis of the intermediate cone, the slotted cone having a plurality of slots and a top portion extending inwardly toward the top opening of the intermediate cone, thereby forming a central passage between the slotted cone and the inner surface of the intermediate cone, the central passage being in fluid communication with the outer passage, each slot permitting the passage of effluent through the slotted cone and out of the bioreactor;

a plurality of beads disposed within the bioreactor and in fluid communication with the effluent, each bead supporting at least one microbial colony for metabolizing nitrogenous nutrient compounds present in the effluent, each bead having a diameter greater than a diameter of the slots, thereby preventing passage of the beads through the slots of the slotted cone; and a circulation system having a pump and a venturi eductor operably coupled to an air inlet, the pump circulating the effluent within the bioreactor and the holding tank, the venturi eductor oxygenating the effluent, wherein an active mixing of effluent from the effluent source may be received to normalize nutrient loading for biological conversion, and wherein the circulation system simultaneously creates a downward flow of effluent and beads within the central passage and an upward flow of effluent and beads within the outer passage;

a second treatment phase for receiving the effluent from the first treatment phase, the second treatment phase including labyrinthal flow baffles having a packed column of sulfur pellets and calcium carbonate granules, the second treatment phase being a hydraulically controlled sulfur reactor for removing the nitrates from the effluent through a conversion to nitrites and then nitrogen gas;

a third treatment phase for receiving the effluent from the second treatment phase, the third treatment phase including a metallic ion adsorption bed for adsorption of phosphorous, heavy metals and toxins;

a fourth treatment phase for receiving effluent from the third treatment phase, the fourth treatment phase including an ultraviolet disinfection apparatus to reduce bacterial and viral pathogens present in water being discharged; and a drain field for receiving treated effluent from the system.

2. A system for treating effluent, the system comprising:

a first housing having a base portion and defining a slotted cone extending upward from the base portion, the slotted cone defining a plurality of openings;

a second housing positioned within the first housing and defining a center axis perpendicular to the base portion of the first housing, the second housing directing a flow of effluent against the openings; and a plurality of beads carried within the first and second housings, the beads configured for supporting aerobic microorganism growth and having a diameter greater than a diameter of the openings, thereby preventing passage of the beads through the openings, wherein the effluent contacts aerobic microorganisms carried on the beads for metabolizing nitrogenous compounds.

3. The system as described in claim 2, wherein the plurality of beads comprises at least one micro-bead.

4. The system as described in claim 2, wherein the first housing comprises a first cone.

5. The system as described in claim 4, wherein the first cone further comprises an outer surface, an inner surface, and a top opening.

6. The system as described in claim 5, wherein the base portion has a diameter greater than a diameter of the top opening.

7. The system as described in claim 6, further comprising an exhaust vent in communication with the top opening.

8. The system as described in claim 2, wherein the second housing comprises a second cone.

9. The system as described in claim 8, wherein the second cone comprises an outer surface, an inner surface, a top opening, and a bottom opening.

10. The system as described in claim 9, the bottom opening having a diameter greater than a diameter of the top opening, an outer passage formed between the outer surface of the second cone and the first housing.

11. The system as described in claim 2, wherein each housing is positioned within a holding tank.

12. The system as described in claim 11, further comprising a circulation system for circulating effluent between an interior and an exterior of the housings.

13. The system as described in claim 12, wherein the circulation system comprises a pump and an effluent oxygenation apparatus for aerating the effluent.

14. The system as described in claim 13, wherein the effluent oxygenation apparatus comprises a venturi eductor coupled to an air inlet.

15. An effluent treatment system comprising:

a first treatment phase having a first treatment member converting ammonia present in an effluent to nitrites and then nitrates;

a second treatment phase downstream of the first treatment phase, the second treatment phase having a second treatment member removing nitrates from the effluent by converting the nitrates to nitrites and then nitrogen gas; and a third treatment phase in fluid communication with at least one of the first and second treatment phases, the third treatment phase having a third treatment member removing phosphorous, heavy metals, and toxins from the effluent, wherein the first treatment member comprises a bioreactor positioned within a holding tank, the bioreactor including a first housing and a second housing, the first housing having a base portion and a slotted cone upstanding from the base portion and defining a plurality of openings for permitting effluent to flow from the bioreactor to the holding tank, the second housing positioned within the first housing and defining a center axis perpendicular to the base portion of the first housing, the second housing directing a flow of effluent against the plurality of openings, a plurality of beads disposed within the bioreactor, each bead having a diameter greater than a diameter of the openings, thereby preventing passage of the beads through the plurality of openings, each bead having a surface configured for supporting at least one microbial colony operable for metabolizing nitrogenous compounds via conversion of ammonia to nitrites and then nitrates.

16. The effluent treatment system as described in claim 15, wherein the second treatment member comprises at least one microbial colony operable for metabolizing nitrate and a series of flow baffles, each flow baffle comprising a cartridge supporting a plurality of both sulfur pellets and calcium carbonate granules.

17. The effluent treatment system as described in claim 16, wherein the at least one microbial colony comprises *Thiobacillus denitrificans*.

18. The effluent treatment system as described in claim 15, wherein the third treatment member includes an interchangeable metallic ion adsorption bed for adsorption of phosphorous, heavy metals, and toxins.

19. The effluent treatment system as described in claim 18, wherein the metallic ion adsorption bed comprises iron ferrite media.

20. The effluent treatment system as described in claim 15, further comprising a fourth treatment phase including an ultraviolet disinfection apparatus for deactivating bacterial and viral pathogens present in the effluent.

* * * * *